United States Patent [19]

Seko et al.

[11] Patent Number: 4,833,884

[45] Date of Patent: May 30, 1989

[54] FLUID ACTUATOR FOR DRIVING ARTICLE-PROCESSING APPARATUS

[75] Inventors: Kiyoshi Seko; Kazuhiko Soe, both of Nagoya; Mitsuru Koike, Ichinomiya; Yoshitaka Iida, Bisai, all of Japan

[73] Assignee: Fuji Machinery Company Ltd., Nagoya, Japan

[21] Appl. No.: 113,407

[22] Filed: Oct. 26, 1987

Related U.S. Application Data

[63] Continuation of Ser. No. 615,367, May 30, 1984, abandoned.

[30] Foreign Application Priority Data

May 30, 1983 [JP] Japan ................................ 58-95404

[51] Int. Cl.[4] ................................................ B60T 7/00

[52] U.S. Cl. ........................................ 60/567; 60/581; 91/520; 83/639

[58] Field of Search ................. 91/516, 517, 518, 519, 91/520, 533, 534, 536; 60/567, 581; 156/510, 515, 583.1; 425/289; 83/639, 380

[56] References Cited

U.S. PATENT DOCUMENTS

| | | | |
|---|---|---|---|
| 28,090 | 5/1860 | Lindsay | 92/13.8 |
| 1,564,693 | 12/1925 | Ledbetter | 91/520 |
| 1,994,974 | 3/1935 | Wiedmann | 91/516 |
| 2,153,637 | 4/1939 | Niven et al. | 91/517 |
| 2,825,309 | 3/1958 | Geiger | 51/516 |
| 3,089,375 | 5/1963 | Williamson | 83/639 X |
| 3,186,309 | 6/1965 | Killebrew | 91/517 |
| 3,407,601 | 10/1968 | Beck | 60/567 X |
| 3,574,039 | 4/1971 | Fehr et al. | 156/515 |
| 3,672,402 | 6/1972 | Bloemer | 92/134 X |
| 3,940,305 | 2/1976 | Stenberg | 156/515 |

*Primary Examiner*—Robert E. Garrett
*Assistant Examiner*—Mark A. Williamson
*Attorney, Agent, or Firm*—Schwartz & Weinrieb

[57] ABSTRACT

A fluid actuator including at least two cylinders connected to a common pressurized-fluid supply mechanism. Actuation units are connected to piston rods of the cylinders, respectively. The piston of one of the cylinders is operated by pressurized fluid, and when the piston is moved back, the pressure in the cylinder is increased to operate the piston of the other cylinder. The actuation units are thus operated with a certain amount of interval of time or in a synchronous mode.

20 Claims, 5 Drawing Sheets

FLUID ACTUATOR FOR DRIVING ARTICLE-PROCESSING APPARATUS

This application is a continuation, of application Ser. No. 615,367 filed May 30, 1984, now abandoned.

FIELD OF THE INVENTION

This invention relates to fluid actuators, and more particularly, to an actuator which employs fluid (gas or liquid) under pressure to operate a number of actuating mechanisms (cylinders) in a desired timed manner so that actuation units associated with the respective actuating mechanisms are brought into predetermined specific modes of operation.

BACKGROUND OF THE INVENTION

In the fields of packaging, transferring, engineering work and the like, common techniques can be utilized to move (push or pull) or elevate an article by means of an air or hydraulic cylinder. For example, it is sufficient to connect the article (to be actuated) directly or indirectly to the piston rod of the cylinder.

However, no prior art has heretofore existed where at least two cylinders with the same or different operational effects are connected to a common pressurized-fluid supply mechanism and one of the cylinders is operated by pressure fluctuations in the other cylinder so that actuation units associated with the respective cylinders are actuated in synchronous or unsynchronous modes. The appearance of such art has been hoped for.

OBJECTS OF THE INVENTION

It is an object of the invention to provide a fluid actuator wherein at least two cylinders with the identical or different operational effects are connected to a common pressurized-fluid supply mechanism, such as a compressor or an air or liquid pump, and one of the cylinders is operated by pressure fluctuations in the other cylinder so that actuation units associated with the respective cylinders are actuated in synchronous or unsynchronous modes.

Another object of the invention is to provide a small-sized and simplified fluid actuator of the above-mentioned character which can be employed as an actuating source for a wide variety of industrial equipment.

SUMMARY OF THE INVENTION

According to the invention, a fluid actuator includes at least one first cylinder having a piston and connected to a pressurized-fluid supply mechanism and at least one second cylinder having a piston and connected to the first cylinder. A first actuation unit is associated with the piston of the first cylinder, while a second actuation unit is associated with the piston of the second cylinder. The supply mechanism is adapted to supply a fluid under a primary pressure into the first cylinder so as to move its piston to a predetermined operating position, thereby moving its associated first actuation unit to its operating position. When the first actuation unit is subjected to an external pressure greater than the primary pressure, however, the piston of the first cylinder is moved back together with the first actuation unit so as to increase the pressure in the first cylinder to a secondary pressure, and the secondary pressure is supplied into the second cylinder. The piston of the second cylinder is adapted to be kept in an inactive position by a force greater than the primary pressure, but smaller than the secondary pressure, thereby holding its associated second actuation unit in an inactive position. When the secondary pressure is supplied into the second cylinder, however, the piston of the second cylinder is moved to a predetermined operating position so as to bring the second actuation unit to its operating position.

BRIEF DESCRIPTION OF THE DRAWINGS

The invention will now be described by way of example and with reference to the accompanying drawings, in which.

DETAILED DESCRIPTION OF THE INVENTION

With reference to the drawings, preferred embodiments of the invention will now be described in detail. One embodiment that will follow is a fluid actuator of the type where a pair of first cylinders M1,M1 and a second cylinder M2, located on a common base F, are adapted to be powered from a common pressurized-air supply mechanism S in such a manner that the cylinders M1,M1 and M2 are operated with a certain amount of interval of time.

Figure 1:
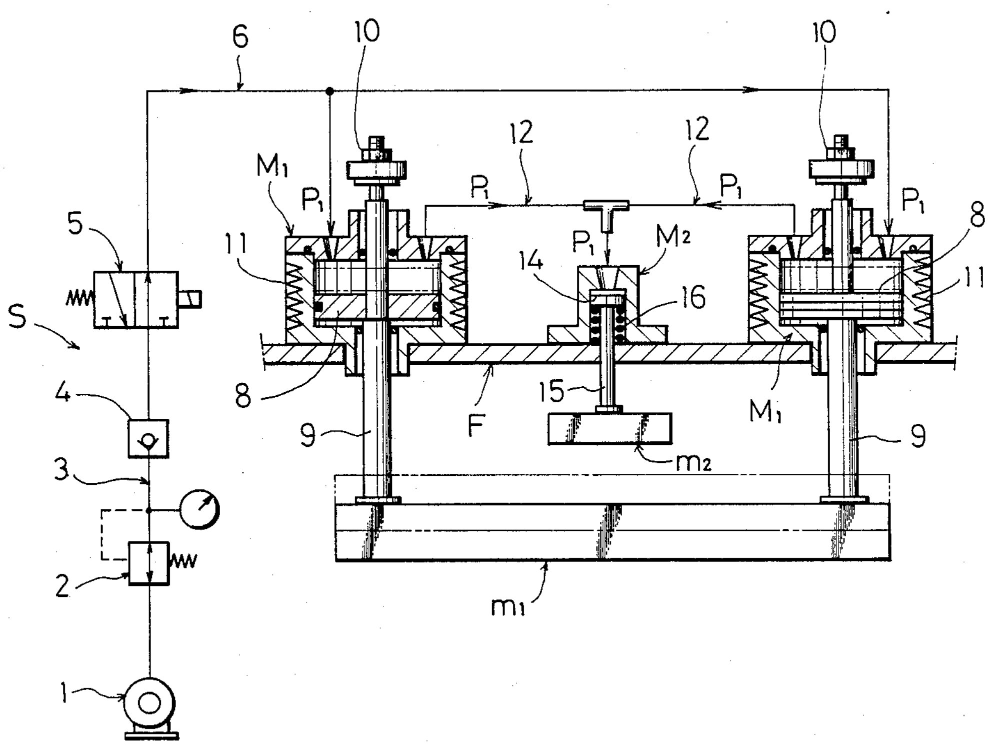
FIG. 1 is a front view of a fluid actuator according to the invention.
Figure 2:
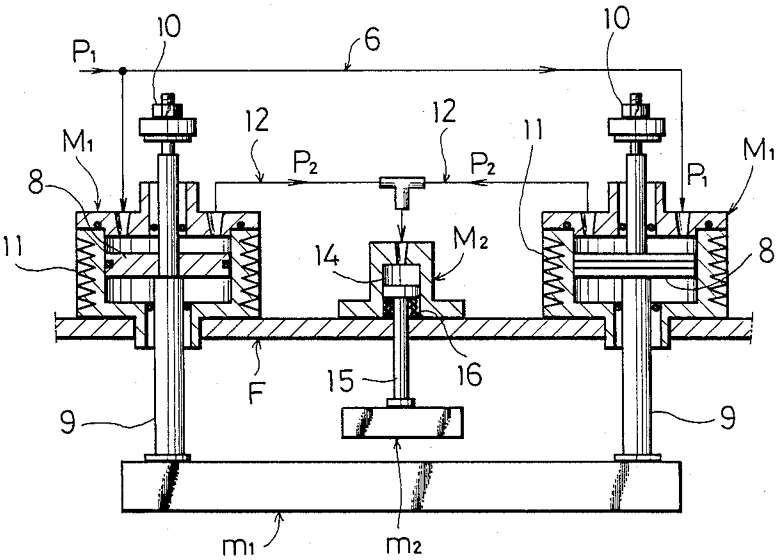
FIG. 2 is a similar view to FIG. 1 which shows the operation of pistons of first and second cylinders.

Referring to FIGS. 1 and 2, the air-supply mechanism S includes a regulator 2 and a check valve 4 which communicate with one another through a first pipe line 3 connected to the discharge side of a compressor 1, all of which are located in series. A directional control valve 5 is connected to one end of the first pipe line 3 at one port thereof. A second pipe line 6 is connected to the first cylinders M1 (hereinafter described) at one end thereof, and to another port of the valve 5 at the other end thereof. The valve 5 is an electromagnetic 2-position, 3-direction control valve which can be set at a position where pressurized fluid may communicate from the compressor 1 into the second pipe line 6 or at a position where the fluid in the pipe line 6 may flow out. Pressurized air supplied from the compressor 1 is adjusted to a required pressure (for example, a primary pressure P1 of 0.5 to 2.5 kg/cm$^2$) by means of the regulator 2, and is then allowed to flow into the second pipe line 6 by means of operating the control valve 5. If required for pressure control, the second pipe line 6 may be provided with a check valve.

The pair of first cylinders M1,M1 with identical constructions are provided upon base F comprising a frame or the like, and are connected to the air supply mechanism S by means of the second pipe line 6 which allows the mechanism S and the cylinders M1,M1 to communicate with each other so that the pressurized air from the mechanism S is supplied into the cylinders M1,M1. The first cylinders are each provided with a pair of ports on the head sides thereof, and the second pipe line 6 connected to one of the ports of each cylinder. Also, a piston 8 with a rod 9 is closely fitted into each cylinder M1. A first actuation unit m1 is fixed to the lower ends of the piston rods 9 so as to be operated by means of the pistons 8 in a predetermined manner. As may be seen from the foregoing description, each piston 8 is adapted to be operated by means of the above-mentioned primary pressure P1. That is, when air under the primary pressure is supplied through the pipe line 6 into each of the cylinders M1, each piston 8 is moved to a predetermined position inside its cylinder so as to keep the first actuation unit m1 in its operating position. Also, each piston 8 is adapted to move back, together with the operation element m1, if the unit m1 is subjected to an external pressure greater than the primary pressure P1 during operation. The piston rods 9 are threaded at the upper ends thereof, and each piston rod 9 is provided, at the threaded portion, with an adjusting nut 10 which can be so adjusted as to control the distance between the nut 10 and the upper end of the cylinder head, thereby setting the effective amount of travel of each piston 8. Reference numeral 11 designates a series of radiating fins provided at the outer surface of the wall of each cylinder M1.

The second cylinder M2, numbering only one in this embodiment, is also provided on the base F and between the first cylinders M1,M1. The second cylinder is provided with a port on the head side thereof, and is connected to the first cylinders by means of a pair of pipe lines 12,12 which extend from the port of the second cylinder to those ports of the first cylinders which are not connected to the second pipe line 6, respectively, so that pressurized air from the supply mechanism S is supplied through the first cylinders M1 into the second cylinder M2. The second cylinder is provided with a piston 14 having a rod 15. A second actuation unit m2 is connected to the lower end of the rod 15. Inside the second cylinder is provided a spring 16 which is so located as to urge the piston 14 backward or upward with a predetermined force P', thereby keeping the piston 14 in an inactive position as set on the cylinder-head side. The force P' exerted against the piston 14 is such as to keep the piston 14 in its inactive position even when the piston 14 is subjected to the primary pressure P1 from the first cylinders M1 so as to urge the piston 14 downward. When the pistons 8 of the first cylinders M1 are moved back or upward, the air pressure inside the first cylinders is increased to a secondary pressure P2. The secondary pressure P2 thus produced is supplied through the pipe lines 12 into the second cylinder M2 and lowers the piston 14 against the force P' of the spring 16. That is, the foregoing forces have a relationship of $P1 < P' < P2$ in terms of magnitude.

Although the base F is of one-piece construction supporting all three cylinders in this embodiment, a separate support means (instead of one common base F) may be provided for each cylinder.

For operation of the fluid actuator hereof, pressurized air is supplied from the supply mechanism S into the cylinders M1,M1 and then into the cylinder M2 so that the pistons 8 of the cylinders M1,M1 are first moved to their operating positions, thus moving the first actuation unit m1 to its operating position. When the actuation unit m1 is subjected to a pressure greater than the primary pressure P1 from the opposite direction, the pistons 8 are moved back against the primary air pressure P1 by a certain amount so that the volume in each cylinder M1 is reduced so as to increase the air pressure in each cylinder M1 to the secondary pressure P2. The air thus increased in pressure is supplied into the second cylinder M2 so that the piston 14, subjected to the secondary pressure P2, is lowered against the force P' of the spring 16 (since $P' < P2$), thus moving the second actuation unit m2 to its operating position. The actuation unit m2 is then kept in this position so as to perform a required action.

When the external pressure against the actuation unit m1 is removed upon completion of the required operation or for any other reason, the piston 8 of each cylinder M1 as well as the actuation unit m1 is lowered to its operating position again, thus increasing the cylinder (M1) volume. Increased volume reduces the air pressure inside each cylinder M1 to the primary pressure P1 again.

When the air pressure in each cylinder M1 has been reduced to the primary pressure P1, the pressurized air in the second cylinder M2 escapes into the first cylinders M1,M1 through the pipe lines 12 so that the pressure in the cylinder M2 is also reduced to the primary pressure P1 again. The pressure thus reduced causes the piston 14 to move back to its inactive position under the action of the spring 16 with the force P' greater than the primary pressure P1. The operations of the pistons 8 and 14 with an interval of time are repeated in this manner so as to operate the actuation units m1 and m2 accordingly. The air in the cylinders M1 and M2 may be discharged as required by operating the control valve 5.

Figure 3:
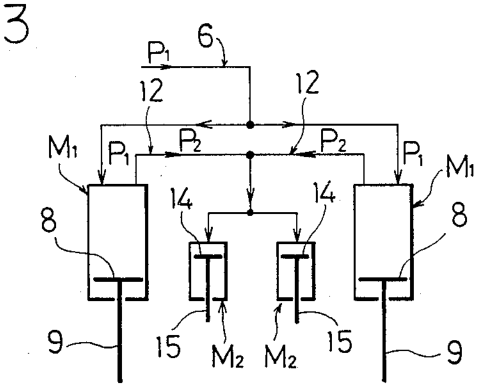
FIGS. 3 and 4 show different enbodiments of the invention.
Figure 4:
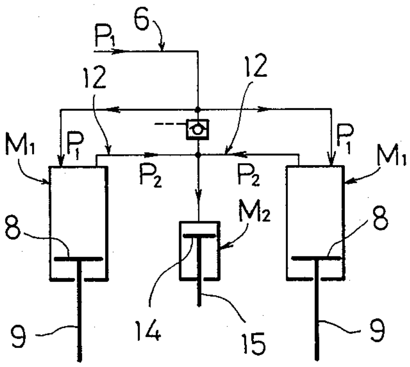

The fluid actuator described above may be modified into different forms as required. For example, the first cylinders M1 as well as the second one M2 may be one in number. Also, as shown in FIG. 3, it is possible to provide both first and second cylinders M1 and M2 in pairs and to connect each pair of cylinders to each other by means of a pipe line and to connect the first cylinders M1,M1 to the second pipe line 6 by means a pipe line interconnecting the first cylinders and the second cylinders M2,M2 to the first cylinders by the pipe lines 12. To be more exact, it is possible to connect two passages branching from one end of the second pipe line 6 to one of two ports provided at the head of the respective first cylinders M1 and to connect the other port of each cylinder M1 to a port provided at the head of the respective second cylinder M2 by means of the pipe lines 12,12. Furthermore, as shown in FIG. 4, the first embodiment may be modified by connecting the second cylinder M2 as well as the first cylinders M1,M1 to the second pipe line 6 by means of an additional pipe line. To be more exact, it is possible to connect two of three passages branching from one end of the second pipe line 6 to one of the two ports of the respective first cylinders M1, connect the remaining passage to the port of the second cylinder M2, and connect this passage leading to the second cylinder M2 by means of the pipe lines 12. For this modification of FIG. 4, one of the two passages (the intermediate passage) may be directly connected to the wall of the second cylinder M2 instead of to its port.

In any of the foregoing modifications, the cylinders M1 and M2 are heated to a high temperature by means of compressed air when the actuator is continuously operated. Therefore, it is recommended to provide each cylinder with a means for radiating heat, such as a tubing material for a cooling medium wound around the cylinder wall or inserted through openings made through the cylinder wall so as to pass a cooling medium (for example, water) into the cylinder.

Figure 5:
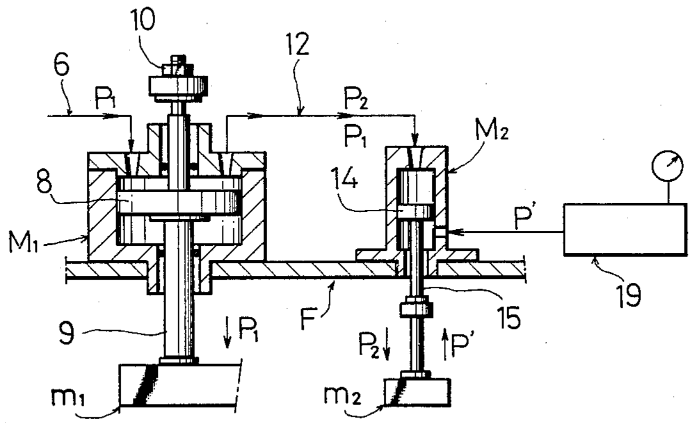
FIGS. 5 and 6 show modifications of a second actuating mechanism (or a second cylinder)

Referring to FIG. 5, it is possible to use a control device 19 instead of the spring 16, which is connected to both the air supply mechanism S and the second cylinder M2 so as to apply a pressure equivalent to the force P' of the spring 16 to the piston 14 for holding the piston 14 in its inactive position. In this case, the connection of the control device 19 to the cylinder M2 is so made as to apply the foregoing pressure from under the piston 14.

Figure 6:
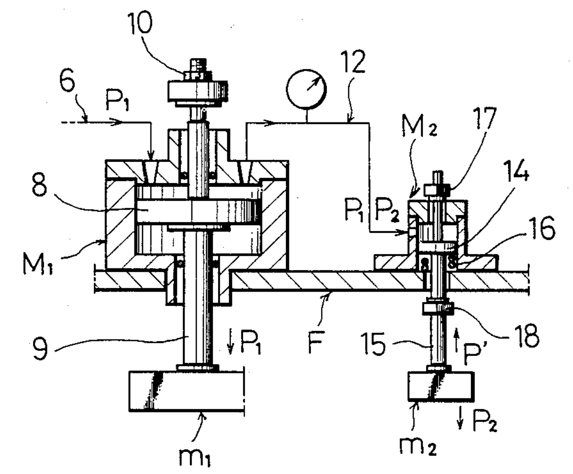

With reference to FIG. 6, the rod 15 is preferably provided with a pair of adjustment pieces 17 and 18 which are so spaced apart from each other as to control or limit the stroke of the piston 14. In this case, each pipe line 12 is connected not to the head of the cylinder M2, but to the wall thereof.

Although the fluid actuator has been described as being operated by pressurized air, it can also be operated by other kinds of gas or liquid under pressure. If liquid is used, the second cylinder M2 can be operated almost simultaneously with the operation of the cylinders M1 since a liquid, because of its incompressible nature, makes the piston respond thereto instantly. Therefore, the find of actuating medium (gas or liquid) may be selected depending on the operating condition, that is whether the cylinders M1 and M2 are to be operated with an interval of time or in a synchronous mode. If liquid is used as an actuating medium, a pump is employed as a fluid-supply mechanism.

Field of Application

The fluid actuator described above may be applied for various purposes such as the following:

(1) Manufacturing cartons, envelopes, paper bags, or the like
(2) Packaging goods, materials, or the like
(3) Filling bottles or other kinds of containers with materials
(4) Attaching labels, tags, or the like
(5) Processing or cutting sheet-shaped materials
(6) Molding or wrapping synthetic resin
(7) Cutting, boring or bending various kinds of materials
(8) Clamping or moving works
(9) Positioning or detecting works
(10) Marking works The fluid actuator can be conveniently employed as a means for operating the devices for performing the above-mentioned functions.

With regard to the actuation units m1 and m2 to be connected to the cylinders M1 and M2, members so shaped as to perform a desired function such as the following may be selected as such units:

(1) Pushing-in, clasping or fixing
(2) Sealing, cutting in a molten condition (melting and cutting), or binding
(3) Cutting, boring, punching or clipping
(4) Stamping
(5) Eyeletting, crimping or binding together

Example of Application

Figure 7:
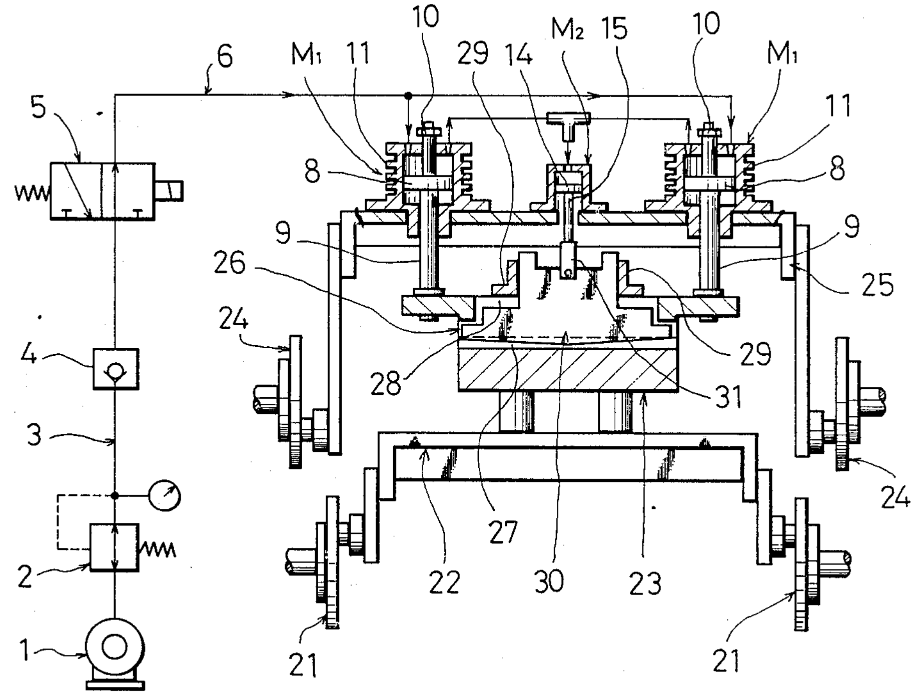
FIG. 7 is a front view of the fluid actuator of FIG. 1 as employed for a sealing equipment.
Figure 8:
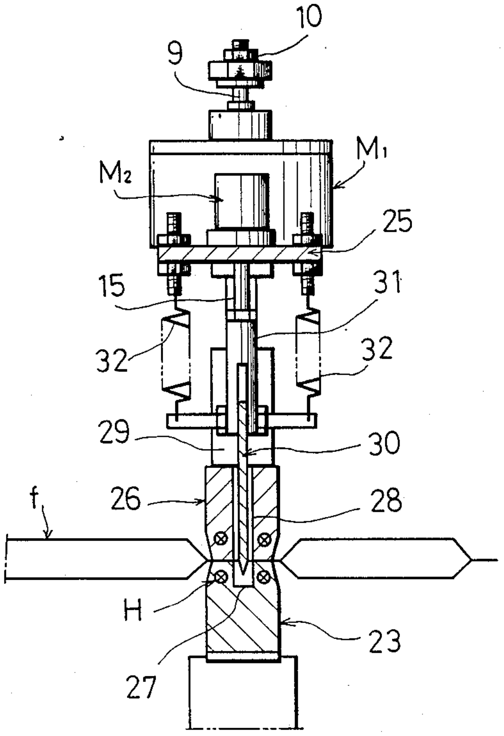
FIG. 8 is side elevation of the actuator of FIG. 7.

Referring to FIGS. 7 and 8, reference will now be made to an example of an actual application of the fluid actuator, namely, an actuator of a sealing equipment for the conventional formfill-seal machine (the usual horizontal pillow-type packer). As with the previous embodiment, a fluid actuator that will follow is an air-operated one. In this example, the same parts as those of the previous embodiment will be designated by the same numerals.

For use of the fluid actuator in a sealing equipment, it is a general practice to provide a lower sealer 23 on a support frame 22 located between and linked with a pair of lower cranks 21,21 and provide an upper sealer 26 and a knife 30 on the side of a support frame 25 located between and linked with a pair of upper cranks 24,24. Both upper and lower cranks 21,21 and 24,24 are connected to the body of the sealing equipment (not shown). Numerals 27 and 28 designate a groove for receiving a knife 30 and a space for passing the knife, respectively, and the alphabetical letter H designates a pair of means provided in each sealer for heating the sealing face of the sealer. On the support frame 25 are provided a pair of first cylinders M1,M1 communicating with an air-supply mechanism S and a second cylinder M2 communicating with the first cylinders. The upper sealer 26 is removably connected to the lower ends of the piston rods 9,9 of the first cylinders M1,M1. When air (under the primary pressure P1) is supplied from the mechanism S into the first cylinders, the pistons 8 are lowered to their bottom dead centers so as to bring the upper sealer 26 to its operating position. The knife 30 is removably connected to the lower end of a piston rod 15 of the second cylinder M2 through means of a support 31 and slidably extends through a guide frame 29 into the space 28. A pair of springs 32 are provided between the support frame 25 and the support rod 31 (FIG. 8) and urges the piston 14 of the cylinder M2 upward with a force P' greater than the primary air pressure P1, thereby keeping the knife 30 as well as the piston 14 in their inactive positions even when the air under the pressure P1 is supplied into the cylinder M2.

Figure 9:
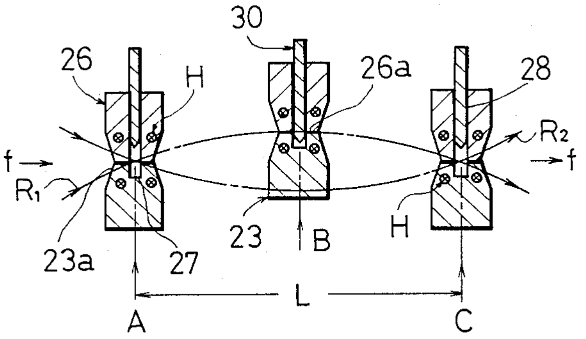
FIG. 9 illustrates the movement of actuation units used in the actuator of FIG. 7.

Referring to FIG. 9, the sealers 23 and 26, when cranked, perform circular motions with sealing faces 23*a* and 26*a* following predetermined loci R1 and R2, respectively, while a cylindrical packaging material f is continuously fed into the sealing equipment. The rate or speed of the motions of the sealers 23 and 26 is set at almost the same as that of the continuous feed of the material f. Every time each sealer makes one circular motion in a simultaneous manner, the material f is heat sealed as shown in FIG. 8. During the circular motions, however, the upper sealer 26 is moved with its sealing face 26*a* following the locus R1 of the sealing face 23*a* of the other sealer 23 while the two sealers travel a distance L required for the sealing of the material, or in other words, the sealers travel through the angular range between points A and C of the intersection of the loci R1 and R2. That is, the sealing faces 26*a* and 23*a* are allowed to travel along the same locus R1 over the distance L so that the two sealing faces contact with each other over the distance L (with portions of the material f to be sealed therebetween), thereby sealing the material within the travel range L.

In this example, the fluid actuator is operated as follows: As the material f is fed from a direction indicated in FIG. 9, the upper sealer 26 held in its operating position by the primary air pressure P1 supplied from the mechanism S into the cylinders M1,M1 (and into the cylinder M2) is cranked together with the lower sealer 23 so as to perform a circular motion. When moved to the point A, the sealing faces 26*a* and 23*a* are brought into contact with each other (with portions of the material f between). Then, the upper sealer26 starts to be pressed upward by the lower one 23 so that the upper sealing face 26*a* as well as the lower one 23*a* starts to move along the lucus R1 of the lower sealing face 23*a*. That is, the piston 8 of each first cylinder M1 is forced upward by the force of the lower sealer 23, thus reducing the cylinder volume so as to increase the pressure of the air in the cylinder a secondary pressure P2. When the sealers 26 and 23 come to an intermediate point B (of the sealing range L), the piston 8 reaches its top dead center so that the upper sealer 26 is subjected to the highest downward pressure and holds the portions of the material f to be sealed, together with the lower sealer 23, with the highest force. The air increased in pressure (that is, given a secondary pressure P2) in the cylinders M1,M1 is supplied through the pipelines 12,12 into the second cylinder M2.

In the second cylinder M2, since the air pressure P2 thus supplied is higher than the force P' of the springs 32, the piston 14 is lowered to bring the knife 30 to its operating position so that the knife 30 cuts in between the sealed portions of the material f while the portions are being firmly held by the sealers 26 and 23. It is to be noted that the knife 30 is subjected to the strongest downward pressure at the point B since the upper sealer 26 is in the highest position at that point so as to increase the secondary pressure P2 to its maximum. That is, the knife 30 is operated a certain amount of time after the sealers 26 and 23 have started sealing, and cuts the material f with a strong force after the predetermined portions of the material f have been completely sealed. After the cutting operation, the upper sealing face 26*a* as well as the lower one 23*a* is moved along a descending portion of the locus R1 between the points B and C so that the upward pressure of the lower sealer 23 against the upper one 26 is gradually reduced, and the piston 8 of each first cylinder M1 is lowered again by means of the secondary air pressure P2. As the piston 8 is thus lowered, each cylinder (M1) volume is increased so as to reduce the air pressure again, and when the piston 8 is completely lowered to its operating position again, the air pressure in each cylinder M1 is reduced to the primary pressure P1 again. Also in the second cylinder M2, when the air under the secondary pressure P2 flows into the first cylinders, the pressure is reduced to the primary pressure P1 again so that the piston 14 is moved to the original upper position under the action of the springs 32. By this movement, the knife is also returned to its inactive position. Incidentally, in the latter half of the sealing range L, the upward movement of the knife 30 is made simultaneously with the downward movement of the upper sealer 26, and it is considered that the sealer 26 and the knife 30 are in the operating position and in the inactive position, respectively, at the point C.

As seen from the above description, the fluid actuator according to the invention certainly meets the timing requirements for two successive operations, namely, heat sealing and cutting of a packaging material. Therefore, it can be used as a preferred means for actuating a sealing equipment.

There are many kinds of machines used in the packaging industry, such as packaging-material processing machines, inner-packaging machines, and outer-packaging machines. With regard to actuation units used for these machines, there are many different kinds of operation modes, such as circular motion (as in this invention), pivoting, circulatory movement (box motion), facing movement and simultaneous movement with the feed of work. Also, there are many different combinations of the first and second actuation units, such as a holder capable of pressing, pushing-in and fixing (as first operation element) and a knife (as second operation element), a holder and a side welder, a holder and a sealer, and a holder and a stamp. The fluid actuator herein can be applied to any of the above-mentioned packaging machines, operation modes, and combinations.

According to the invention, the first cylinders are connected to the pressurized-fluid supply mechanism (employing a compressor, pump or the like) through the pipe line a, and the second cylinder is connected to the first cylinders through the pipe lines 12. That is, both first and second cylinders are supplied with actuating fluid by the common supply source. Therefore, the invention makes it possible to make the whole actuating mechanism one small-sized and simplified one. In particular, since the pistons of the first and second cylinders can be operated exactly with a predetermined interval of the time, desired different timings of operations of the actuation units m1 and m2 can be obtained. Also, liquid as well as gas can be employed as an actuating medium. Moreover, since the first and second cylinders can be located on a common support (base) or separate supports, it is possible to construct the whole actuator into different forms. Therefore, the actuator herein can be employed in a wide variety of industries and for many different purposes. Obviously, many modifications and variations of the present invention are possible in light of the above teachings. It is therefore to be understood that within the scope of the appended claims, the present invention may be practiced otherwise than as specifically described herein.

What is claimed is:

1. A fluid actuating system for use in article processing equipment, comprising:

a source of pressurized fluid at a first fluid pressure value;

first conduit means having one end thereof fluidically connected to said source of pressurized fluid for transmitting said pressurized fluid from said source of pressurized fluid;

first cylinder means having a first cylinder chamber fluidically connected to the other end of said first conduit means and having a first piston-piston rod assembly disposed therein for movement in a first direction under the influence of said pressurized fluid at said first fluid pressure value, said first piston rod having one end thereof connected to said first piston while the other end of said first piston rod projects outwardly from said first cylinder means;

second cylinder means fluidically connected to said first cylinder chamber of said first cylinder means and having a second piston-piston rod assembly disposed therein for movement in a first direction under the influence of pressurized fluid;

biasing means operatively connected to said second piston-piston rod assembly means for exerting a force, upon said second piston-piston rod assembly means in a second direction opposite to said first direction, which is greater than said first fluid pressure value but less than a second fluid pressure value which is greater than said first fluid pressure value, whereby when said pressurized fluid at said first fluid pressure value is transmitted to said second cylinder means from said first cylinder chamber of said first cylinder means, said second piston-piston rod assembly means will be prevented by said biasing means from moving in said first direction, but when said pressurized fluid at said second fluid pressure value is transmitted to said second cylinder means from said first cylinder chamber of said first cylinder means, said second piston-piston rod assembly means will be moved in said first direction as a result of said second fluid pressure value overcoming said force of said biasing means;

valve means disposed within said first conduit means between said pressurized fluid source and said first cylinder means for preventing the transmission of any of said pressurized fluid within said first conduit means from said first cylinder chamber of said first cylinder means back to said source of pressurized fluid whereby said pressurized fluid at said second fluid pressure value is caused to flow from said first cylinder chamber of said first cylinder means to said second cylinder means and thereby move said second piston-piston rod assembly in said first direction;

first article-processing actuation means operatively connected to said other end of said first piston rod disposed outside of said first cylinder means so as to be movable with said first piston-piston rod assembly means for performing a first article-processing step upon said article;

second article-processing actuation means operatively connected to said second piston-piston rod assembly means so as to be movable with said second piston-piston rod assembly means for cooperating with said first article-processing actuation means in the performance of a second article-processing step upon said article; and means operatively connected to said first article-processing actuation means for causing movement of said first article-processing actuation means, and said first piston-piston rod assembly means within said first cylinder means, in a second direction opposite to said first direction and against said pressurized fluid of said first fluid pressure value within said first cylinder chamber of said first cylinder means so as to pressurize said pressurized fluid at said first fluid pressure value within said first cylinder chamber of said first cylinder means to said second fluid pressure value and thereby move said second piston-piston rod assembly means and said second article-processing actuation means in said first direction against said biasing force of said biasing means for performance of said second article processing step upon said article.

2. A fluid actuator as defined in claim 1 wherein said first cylinder means, is provided with a pair of ports at the head side thereof and one end of said first conduit means is connected to one port of said first cylinder.

3. A fluid actuator as defined in claim 2, wherein:

said second cylinder means is provided with a port at the head side thereof and said port of said second cylinder means is fluidically connected to the port of said first cylinder means not connected to said first conduit means by means of a second conduit means so that not only the fluid under said first pressure value supplied from said source into said first cylinder means is supplied into said second cylinder means, but the fluid under said second pressure value is also supplied into said second cylinder means when the fluid in said first cylinder means has been increased to said second pressure value.

4. A fluid actuator as defined in claim 2, wherein:

said second cylinder means is provided with a port at the head side thereof, a second conduit means has one end thereof connected to said first conduit means while a second end thereof is connected to said port of said second cylinder means such that the second cylinder means is connected directly to said source of pressurized fluid through means of said first conduit means, and the other port of said first cylinder means is connected to said second conduit means.

5. A fluid actuation as defined in claim 1 wherein said piston rod of first cylinder means is threaded at the end thereof not supporting said first actuation means and a nut is connected to said threaded portion and is capable of being operated so as to control the distance between said nut and the outer surface of the head of said first cylinder means, thereby enabling an adjustment of the effective amount of travel of said piston of first cylinder means.

6. A fluid actuator as defined in claim 1, wherein:

said biasing means comprises a spring with a predetermined force acting upon said piston of said second cylinder means so as to keep said piston of said second cylinder means in an inactive position.

7. A fluid actuating system as set forth in claim 1, wherein:

said source of pressurized fluid is a compressor.

8. A fluid actuating system as set forth in claim 7, further comprising:

a regulator disposed within said first conduit means for predetermining said pressure of said pressurized fluid at said first fluid pressure value.

9. A fluid actuating system as set forth in claim 8, wherein:

said valve means comprises a check valve.

10. A fluid actuator as defined in claim 9 wherein said regulator is located closer to said compressor than said check valve, said regulator and said check valve being positioned in series.

11. A fluid actuating system as set forth in claim 9, further comprising:

a two-position control valve disposed within said first conduit means for transmitting said pressurized fluid to said first cylinder means when said control valve is disposed within a first position, and for permitting said pressurized fluid to be discharged from said first cylinder means to a reservoir when said control valve is disposed within a second position.

12. A fluid actuating system as set forth in claim 11, wherein:

said compressor, said regulator, said check valve, and said two-position control valve are disposed in series within said first conduit means.

13. A fluid actuating system as set forth in claim 1, wherein:

said biasing means comprises a fluid control device fluidically connected to said second cylinder means so as to impress fluid pressure upon said second piston-piston rod assembly means with said force so as to keep said second piston-piston rod assembly means at an inactive position.

14. A fluid actuating system as set forth in claim 1, wherein:

said first cylinder means comprises a pair of cylinders.

15. A fluid actuating system as set forth in claim 1, wherein:

said second cylinder means comprises a pair of cylinders.

16. A fluid actuating system as set forth in claim 1, wherein:

said second cylinder means is fluidically connected to said source of pressurized fluid by means of a second conduit means; and a second valve means is disposed within said second conduit means for preventing the transmission of any of said pressurized fluid within said second conduit means from said second cylinder means back to said source of pressurized fluid.

17. A fluid actuating system as set forth in claim 1, wherein:

said first actuation means comprises sealing means within packaging material sealing equipment; and said second actuation means comprises a cutting knife.

18. A fluid actuating system for use in article processing equipment, comprising a source of pressurized fluid at a first fluid pressure value;

first conduit means having one end thereof fluidically connected to said source of pressurized fluid for transmitting said pressurized fluid from said source of pressurized fluid;

first cylinder means, having a first cylinder chamber and a pair of ports fluidically connected with said first cylinder chamber, fluidically connected by means of a first one of said pair of ports to the other end of said first conduit means and having a first piston-piston rod assembly disposed therein for movement in a first direction under the influence of said pressurized fluid at said first fluid pressure value;

second cylinder means fluidically connected to said first cylinder chamber of said first cylinder means by means of a second one of said pair of ports of said first cylinder means and having a second piston-piston rod assembly disposed therein for movement in a first direction under the influence of pressurized fluid;

biasing means operatively connected to said second piston-piston rod assembly for exerting a force, upon said second piston-piston rod assembly means in a second direction opposite to said first direction, which is greater than said first fluid pressure value but less than a second fluid pressure value which is greater than said first fluid pressure value, whereby when said pressurized fluid at said first fluid pressure value is transmitted to said second cylinder means from said first cylinder chamber of said first cylinder means, said second piston-piston rod assembly means will be prevented by said biasing means from moving in said first direction, but when said pressurized fluid at said second fluid pressure value is transmitted to said second cylinder means from said first cylinder chamber of said first cylinder means, said second piston-piston rod assembly means will be moved in said first direction as a result of said second fluid pressure value overcoming said force of said biasing means;

valve means disposed within said first conduit means between said pressurized fluid source and said first cylinder means for preventing the transmission of any of said pressurized fluid within said first conduit means from said first cylinder chamber of said first cylinder means back to said source of pressurized fluid whereby said pressurized fluid at said second fluid pressure value is caused to flow from said first cylinder chamber of said first cylinder means to said second cylinder means and thereby move said second piston-piston rod assembly means in said first direction;

first article-processing actuation means operatively connected to said first piston-piston rod assembly means so as to be movable with said piston-piston rod assembly means for the performance of a first article-processing step upon said article;

second article-processing actuation means operatively connected to said second piston-piston rod assembly means so as to be movable with said second piston-piston rod assembly means for cooperating with said first article-processing actuation means in the performance of a second article-processing step upon said article; and means operatively engaged with said first article-processing actuation means for causing movement of said first article-processing actuation means, and said first piston-piston rod assembly means within said first cylinder means, in a second direction opposite to said first direction and against said pressurized fluid of said first fluid pressure value within said first cylinder chamber of said first cylinder means so as to pressurize said pressurized fluid at said first fluid pressure value within said first cylinder chamber of said first cylinder means to said second fluid pressure value and thereby move said second piston-piston rod assembly means and said second article-processing actuation means in said first direction against said biasing force of said biasing means for performance of said second article processing step upon said article.

19. A fluid actuating system as set forth in claim 18, wherein:

said first cylinder means comprises a pair of cylinders; and said second cylinder means comprises a single cylinder.

20. A fluid actuating system as set forth in claim 18, wherein:

said first cylinder means comprises a pair of cylinders; and said second cylinder means comprises a pair of cylinders.

* * * * *